(12) United States Patent
Yoneda

(10) Patent No.: US 10,906,194 B2
(45) Date of Patent: Feb. 2, 2021

(54) STRUCTURE OF JOINT OF ROBOT INCLUDING DRIVE MOTOR AND REDUCTION GEAR

(71) Applicant: FANUC CORPORATION, Yamanashi (JP)

(72) Inventor: Keishi Yoneda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 37 days.

(21) Appl. No.: 16/355,947

(22) Filed: Mar. 18, 2019

(65) Prior Publication Data
US 2019/0291284 A1    Sep. 26, 2019

(30) Foreign Application Priority Data

Mar. 20, 2018    (JP) .................................. 2018-052947

(51) Int. Cl.
*B25J 18/04*    (2006.01)
*B25J 9/10*    (2006.01)
(Continued)

(52) U.S. Cl.
CPC ............. *B25J 18/04* (2013.01); *B25J 9/0009* (2013.01); *B25J 9/06* (2013.01); *B25J 9/102* (2013.01); *B25J 17/025* (2013.01)

(58) Field of Classification Search
CPC .... B25J 17/00; B25J 17/0258; B25J 17/0283; B25J 17/0241; B25J 17/025; B25J 18/00;
(Continued)

(56) References Cited

U.S. PATENT DOCUMENTS 4,846,018 A * 7/1989 Matsumoto .............. B25J 9/102
                                                        475/149
4,933,531 A * 6/1990 Ichikawa ............... B23K 11/31
                                                       219/86.25
(Continued)

FOREIGN PATENT DOCUMENTS

JP    H02198789 A    8/1990
JP    H09150389 A    6/1997
(Continued)

OTHER PUBLICATIONS

English Abstract and Machine Translation for Japanese Publication No. JPH02-198789A, published Aug. 7, 1990, 6 pgs.
(Continued)

*Primary Examiner* — Jake Cook
*Assistant Examiner* — T. Scott Fix
(74) *Attorney, Agent, or Firm* — Fredrikson & Byron, P.A.

(57) ABSTRACT

A structure of a joint includes a reduction gear including a shaft configured to support a gear and including a reduction gear case to which rotational force of the gear is transmitted. The joint includes an interposition member interposed between a servo motor and a pivot base. The servo motor is fixed to the interposition member with motor fixing bolts. The shaft is fixed to the pivot base with shaft fixing bolts. A diameter of the positions of the motor fixing bolts and a diameter of the positions of the shaft fixing bolts are smaller than an outer diameter of the reduction gear case. The interposition member has a shape for fixing the motor fixing bolts at positions away from the shaft fixing bolts.

5 Claims, 7 Drawing Sheets

(51) Int. Cl.
*B25J 9/00* (2006.01)
*B25J 9/06* (2006.01)
*B25J 17/02* (2006.01)

(58) Field of Classification Search
CPC ... B25J 18/04; B25J 18/007; B25J 9/02; B25J 9/102; B25J 9/1025
USPC .......................... 74/490.03, 490.05, 490.06
See application file for complete search history.

(56) References Cited

U.S. PATENT DOCUMENTS

| | | | | |
|---|---|---|---|---|
| 4,953,992 | A * | 9/1990 | Torii | B25J 17/0241 384/607 |
| 5,593,293 | A * | 1/1997 | Machino | B25J 9/0009 414/729 |
| 2006/0170384 | A1 * | 8/2006 | Kumagai | B25J 19/0004 318/568.11 |
| 2010/0224021 | A1 * | 9/2010 | Long | B25J 9/108 74/490.01 |
| 2011/0048157 | A1 * | 3/2011 | Long | B25J 9/1025 74/490.03 |
| 2016/0193735 | A1 * | 7/2016 | Krumbacher | B25J 17/00 74/490.02 |
| 2017/0106543 | A1 * | 4/2017 | Andoh | F16H 1/32 |
| 2018/0133905 | A1 * | 5/2018 | Smith | F16D 28/00 |

FOREIGN PATENT DOCUMENTS

| | | |
|---|---|---|
| JP | 9300254 A | 11/1997 |
| JP | 2014136294 A | 7/2014 |
| JP | 201527714 A | 2/2015 |
| JP | 2015123508 A | 7/2015 |

OTHER PUBLICATIONS

English Abstract and Machine Translation for Japanese Publication No. JPH09-150389 A, published Jun. 10, 1997, 10 pgs.
English Abstract and Machine Translation for Japanese Publication No. 2015-123508 A, published Jul. 6, 2015, 11 pgs.
English Abstract and Machine Translation for Japanese Publication No. 2015-027714 A, published Feb. 12, 2015, 15 pgs.
English Abstract and Machine Translation for Japanese Publication No. 2014-136294 A, published Jul. 28, 2014, 11 pgs.
English Abstract and Machine Translation for Japanese Publication No. 09-300254 A, published Nov. 25, 1997, 10 pgs.

* cited by examiner

Prior Art

STRUCTURE OF JOINT OF ROBOT INCLUDING DRIVE MOTOR AND REDUCTION GEAR

BACKGROUND OF THE INVENTION

1. Field of the Invention

The present invention relates to a structure of a joint of a robot, which includes a drive motor and a reduction gear.

2. Description of the Related Art

A robot includes a plurality of members jointed through the intermediation of joints. In the joint, a servo motor is arranged so as to drive one member with respect to another member. With the drive of the servo motor, an orientation of the other member is changed with respect to the one member (see, for example, Japanese Unexamined Patent Publication No. 2015-123508 A and Japanese Unexamined Patent Publication No. 09-300254 A). Further, in the joint, a reduction gear for increasing the output torque of the servo motor is arranged (for example, see Japanese Unexamined Patent Publication No. 2014-136294 A and Japanese Unexamined Patent Publication No. 2015-27714 A).

For example, an articulated robot includes a plurality of joints. The articulated robot includes a pivot base rotating about a rotary axis extending in a vertical direction, an arm turning with respect to the pivot base, and a joint arranged between the pivot base and the arm. With the drive of the servo motor, the orientation of the arm is changed with respect to the pivot base.

SUMMARY OF THE INVENTION

A cantilever structure for supporting the arm from one side can be adopted to the joint arranged between the pivot base and the arm. The servo motor can be fixed to, for example, the pivot base. The reduction gear can include an input shaft, a reduction gear case, a gear arranged in the reduction gear case, and a shaft for supporting the gear. The input shaft for receiving the rotational force of the servomotor transmits the rotational force to the gear. By the rotation of the gear, the shaft can be rotated relatively to the reduction gear case.

In the case of such reduction gear, the reduction gear case can be fixed to the pivot base. The shaft can be fixed to the arm. The output of the servo motor is reduced in rotation speed by the gear, whereby the arm fixed to the shaft can be turned.

Incidentally, the arm is fixed to the shaft of the reduction gear with bolts. In order to fix the shaft, the bolts are required to be inserted in the arm from a side which is opposite to a side on which the reduction gear is arranged. In order to form insertion holes through which the bolts are inserted, it is preferable that the arm is formed to be thin. Thus, in regions where the bolts are arranged, a recess can be formed in the arm so as to make the arm to be thin. The bolts can be arranged in the recess. However, there is a problem in that the portion of the arm in which the recess is formed has small rigidity.

Further, the arm and an end effector mounted to a leading end of the arm have a high weight. Thus, the arm is required to be fixed to the shaft of the reduction gear with a large number of bolts. There is a problem in that appearance is degraded because the large number of bolts are visible from the outside of the arm.

A structure of a joint according to an aspect of the present disclosure is a structure of a joint of a robot in which a first member and a second member are joined through the intermediation of the joint, and the first member and the second member turn relatively to each other. The structure of the joint includes a drive motor configured to drive the second member with respect to the first member. The structure of the joint includes a reduction gear. The reduction gear includes an input shaft configured to receive the rotational force of the drive motor, a gear configured to transmit a rotational force of the input shaft, a gear support member configured to support the gear, and a reduction gear case to which the rotational force of the gear is transmitted. The structure of the joint includes an interposition member interposed between the drive motor and the first member. The drive motor is fixed to the interposition member with a plurality of motor fixing bolts arranged in a circumferential direction. The interposition member is fixed to the first member. The gear support member is fixed to the first member with a plurality of support member fixing bolts arranged in the circumferential direction. The gear reduction case is fixed to the second member. The motor fixing bolts and the support member fixing bolts are arranged at positions such that a diameter of the positions where the motor fixing bolts are arranged and the diameter of the positions where the support member fixing bolts are arranged are smaller than an outer diameter of the reduction gear case. The interposition member has a shape for fixing the motor fixing bolts at positions away from the support member fixing bolts.

DETAILED DESCRIPTION

Figure 1:
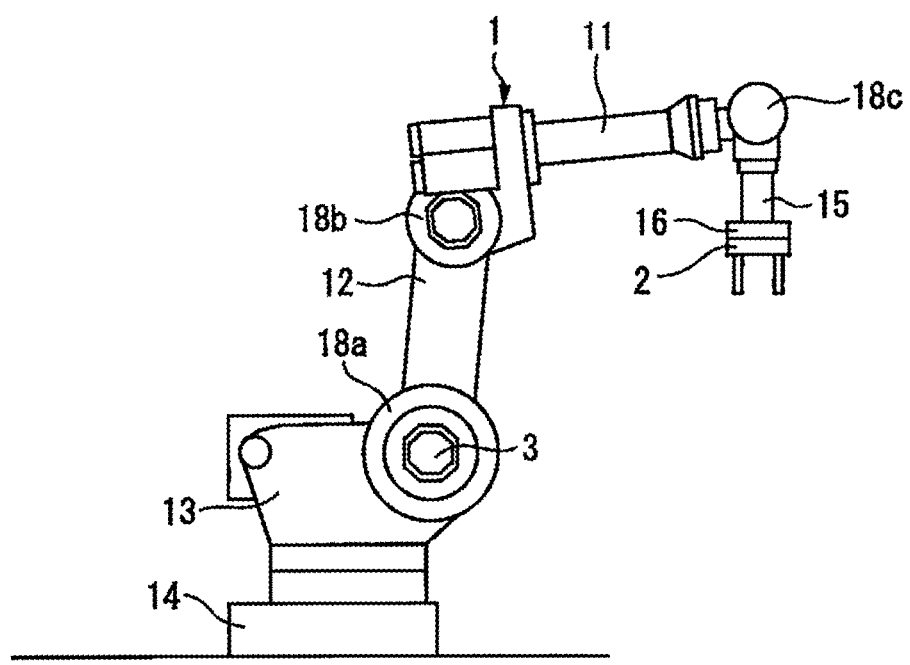
FIG. 1 is a schematic diagram of a robot according to an embodiment.

With reference to FIG. 1 to FIG. 7, a structure of a joint of a robot according to an embodiment will be described. FIG. 1 is a schematic diagram of a robot device according to the present embodiment. The robot device includes a hand 2 as an end effector configured to hold a workpiece and a robot 1 configured to move the hand 2.

The robot 1 according to the present embodiment is an articulated robot including a plurality of joints 18a, 18b, and 18c. The robot 1 includes a plurality of members. The members of the robot 1 are formed in order to rotate about predetermined drive axes, respectively.

The robot 1 includes a base 14, a pivot base 13 supported by the base 14 as members of the robot 1. The base 14 is fixed to an installation surface. The pivot base 13 turns with respect to the base 14. The pivot base 13 rotates about a rotary axis extending in a direction perpendicular to the installation surface. The robot 1 includes an upper arm 11 and a lower arm 12 as members of the robot 1. The lower arm 12 is supported by the pivot base 13 through the intermediation of the joint 18a. The upper arm 11 is supported by the lower arm 12 through the intermediation of the joint 18b. The robot 1 includes a wrist 15 jointed to an end of the upper arm 11. The wrist 15 is supported by the upper arm 11 through intermediation with the joint 18c. The wrist 15 includes a flange 16 for fixing the hand 2.

The robot 1 in the present embodiment includes robot drive device configured to drive the respective members such as the upper arm 11. The robot drive device in the present embodiment includes servo motors as drive motors configured to drive the upper arm 11, the lower arm 12, the pivot base 13, and the wrist 15. In the present embodiment, the servo motor is arranged to each of the members. In the joint, an orientation of the member of the robot 1 is changed. Accordingly, a position and an orientation of the robot 1 are changed.

In the present embodiment, the joint 18a arranged between the pivot base 13 and the lower arm 12 is illustrated among the plurality of joints 18a, 18b, and 18c.

Figure 2:
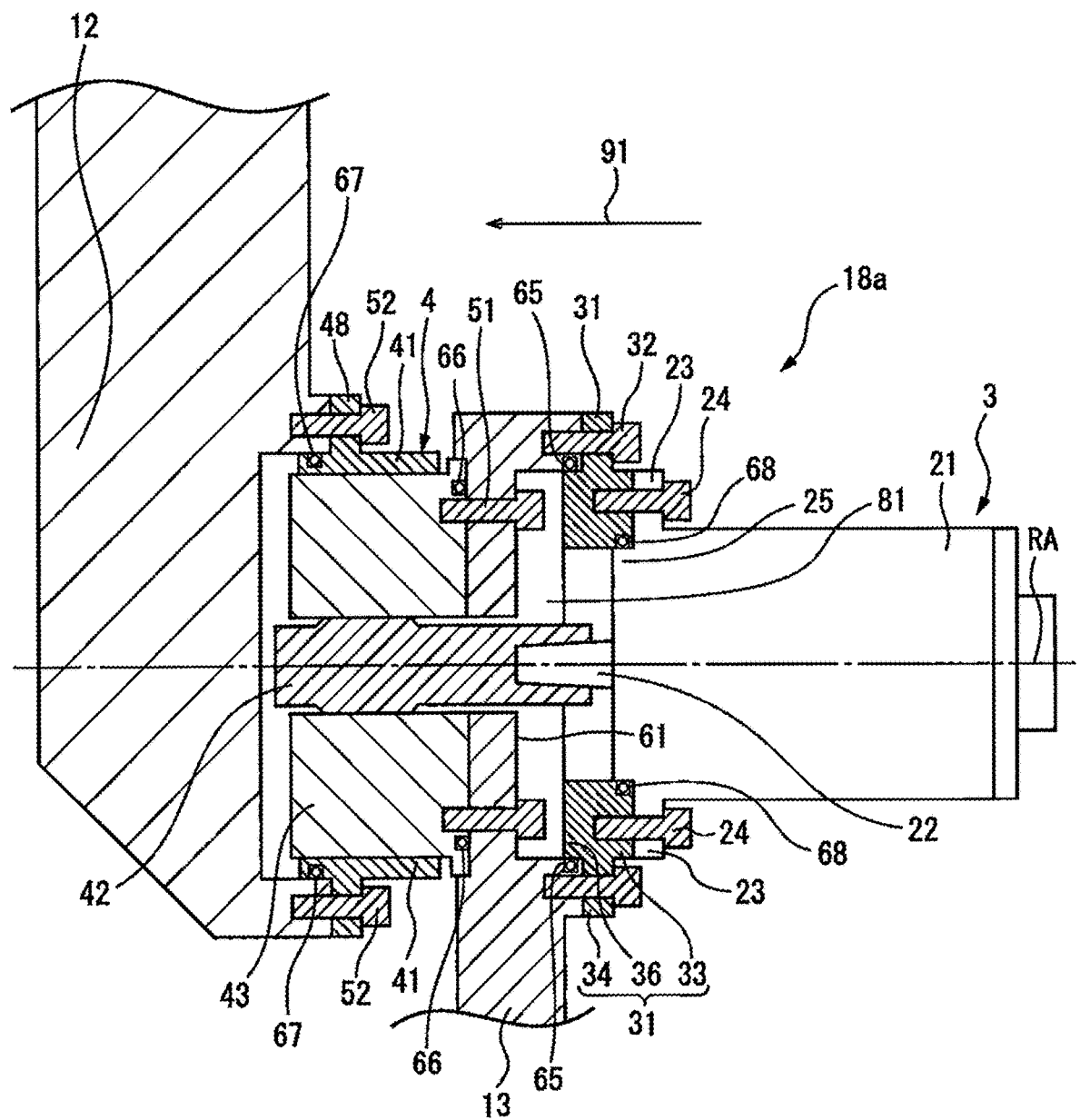
FIG. 2 is an enlarged schematic cross-sectional diagram of a first joint according to the embodiment.

FIG. 2 is an enlarged schematic cross-sectional diagram of the joint arranged between the pivot base and the lower arm. The joint 18a in the present embodiment has a cantilever structure for supporting the arm 12 from one side of the lower arm 12. In the present embodiment, the pivot base 13 corresponds to a first member forming the robot 1. Further, the lower arm 12 corresponds to a second member forming the robot 1. The lower arm 12 turns with respect to the pivot base 13.

The joint 18a includes a servo motor 3 as a drive motor configured to drive the lower arm 12 with respect to the pivot base 13 and a reduction gear 4 configured to increase the output torque of the servo motor 3. The servo motor 3 is fixed to the pivot base 13. The servo motor 3 includes a main body 21 in which a magnet, a coil, and the like are arranged, and a flange portion 23 protruding outward in a radial direction from the main body 21. The servo motor 3 includes an output shaft 22 configured to protrude from the main body 21 to the reduction gear 4 and output the rotational force.

The reduction gear 4 includes an input shaft 42 configured to receive the rotational force of the servo motor 3. The reduction gear 4 includes a plurality of gears configured to transmit the rotational force of the input shaft 42, and a shaft 43 serving as a gear support member configured to support the gears. The reduction gear 4 includes a reduction gear case 41 to which the rotational force of the gears is transmitted. The reduction gear case 41 rotates relatively to the shaft 43.

The shaft 43 of the reduction gear 4 is fixed to the pivot base 13 with shaft fixing bolts 51 serving as support member fixing bolts. The shaft fixing bolts 51 are arranged in a recess 61 formed in the pivot base 13. The plurality of shaft fixing bolts 51 are arranged in a circumferential direction.

The reduction gear case 41 is formed so as to surround the shaft 43. The reduction gear case 41 is formed in a cylindrical shape. The lower arm 12 is fixed to the reduction gear case 41 with arm fixing bolts 52 serving as member fixing bolts. The reduction gear 4 includes a flange portion 48 protruding outward in the radial direction from the reduction gear case 41. The arm fixing bolts 52 are arranged so as to be inserted through the flange portion 48. The plurality of arm fixing bolts 52 are arranged in the circumferential direction.

In the present embodiment, the lower arm 12 is fixed to the reduction gear case 41 with the arm fixing bolts 52. However, the present invention is not limited to this embodiment. The lower arm may be fixed to the reduction gear case by any method. For example, the lower arm may be fixed to the gear reduction case by welding, adhesion, or the like.

The arrow 91 indicates a direction from the pivot base 13 toward the lower arm 12. Alternatively, the arrow 91 indicates a direction from the servo motor 3 toward the lower arm 12. The arm fixing bolts 52 and the shaft fixing bolts 51 are inserted and fixed in the direction indicated by the arrow 91.

The input shaft 42 of the reduction gear 4 is joined to the output shaft 22 of the servo motor 3. The rotary axis of the input shaft 42 is arranged so as to be coaxial with the rotary axis of the output shaft 22. The output shaft 22 and the input shaft 42 rotate about a rotary axis RA. The rotary axis RA is a rotary axis of the joint 18a.

The joint 18a in the present embodiment includes an interposition member 31 interposed between the servo motor 3 and the pivot base 13. The interposition member 31 in the present embodiment is formed in an annular shape. The interposition member 31 includes a main body 33 formed in an annular shape and a flange portion 34 protruding outward in the radial direction from the main body 33. The interposition member 31 is fixed to the pivot base 13 with interposition member fixing bolts 32. The plurality of interposition member fixing bolts 32 are arranged in the circumferential direction. The interposition member fixing bolts 32 pass through the flange portion 34. The interposition member fixing bolts 32 are arranged outside of the recess 61 of the pivot base 13.

In the present embodiment, the interposition member 31 is fixed to the pivot base 13 with the interposition member fixing bolts 32. However, the present invention is not limited to this embodiment. The interposition member may be fixed to the pivot base by any method. For example, the interposition member may be fixed to the pivot base by welding, adhesion, or the like.

The interposition member 31 includes a fitting portion 36 that fits to the recess 61 of the pivot base 13. In the present embodiment, a part of the main body 33 functions as the fitting portion 36. The fitting portion 36 fits to the recess 61. The fitting portion 36 is shaped such that the center axis of the interposition member 31 coincides with the rotary axis RA when the interposition member 31 is fit into the recess 61.

The servo motor 3 includes a fitting portion 25 that fits to an inner surface of the interposition member 31. In the present embodiment, the part of the leading end of the main body 21 functions as the fitting portion 25. The fitting portion 25 has a shape fitting to the main body 33 of the interposition member 31. The fitting portion 25 is shaped such that the rotary axis of the output shaft 22 of the servo motor 3 coincides with the rotary axis RA when the main body 21 of the servo motor 3 fits to the interposition member 31.

In the present embodiment, the fitting portion 36 of the interposition member 31 fits to the recess 61 of the pivot base 13 and the fitting portion 25 of the servo motor 3 fits to the interposition member 31, whereby the rotary axis of the input shaft 42 of the reduction gear 4 and the rotary axis of the output shaft 22 of the servo motor 3 are coaxial with each other. Accordingly, by inserting the fitting portion 36 of the interposition member 31 to the recess 61 of the pivot base 13, and by inserting the fitting portion 25 of the servo motor 3 to the interposition member 31, an operator can easily perform coaxial alignment of the reduction gear 4 and the servo motor 3. Note that, the interposition member may not include a fitting portion that fits to the pivot base. Further, the motor may not include a fitting portion that fits to the interposition member.

The servo motor 3 is fixed to the interposition member 31 with motor fixing bolts 24. The plurality of motor fixing bolts 24 are arranged in the circumferential direction. The motor fixing bolts 24 pass through the flange portion 23. The interposition member fixing bolts 32 and the motor fixing bolts 24 are fixed in the direction indicated by the arrow 91. Further, the fitting portion 36 of the interposition member 31 is inserted into the recess 61 of the pivot base 13 in the direction indicated by the arrow 91. Further, the fitting portion 25 of the servo motor 3 is inserted into a hole of the interposition member 31 in the direction indicated by the arrow 91.

In an inner space 81 of the joint 18a including the reduction gear 4, a lubricant such as grease is provided. The inner space 81 is a space surrounded by the lower arm 12, the reduction gear case 41, the recess 61 of the pivot base 13, the interposition member 31, and the main body 21 of the servo motor 3. In the joint 18a, sealing members 65, 66, 67, and 68 are arranged such that the lubricant provided in the inner space 81 is prevented from spilling out. The sealing members 65, 66, 67, and 68 can be formed of an elastic member such as rubber. For example, the sealing members 65, 66, 67, and 68 are O-rings. The sealing member 65 is arranged at a portion where the interposition member 31 and the pivot base 13 are held in contact with each other. The sealing member 65 is arranged on an inside of the interposition member fixing bolts 32. The sealing member 66 is arranged at a portion where the shaft 43 and the pivot base 13 are held in contact with each other. The sealing member 66 is arranged on an outside of the shaft fixing bolts 51. The sealing member 67 is arranged at a portion where the reduction gear case 41 and the lower arm 12 are held in contact with each other. The sealing member 67 is arranged on an inside of the arm fixing bolts 52. The sealing member 68 is arranged at a portion where the main body 21 of the servo motor 3 and the main body 33 of the interposition member 31 are held in contact with each other. The sealing member 68 is arranged on an inside of the motor fixing bolts 24.

Figure 3:
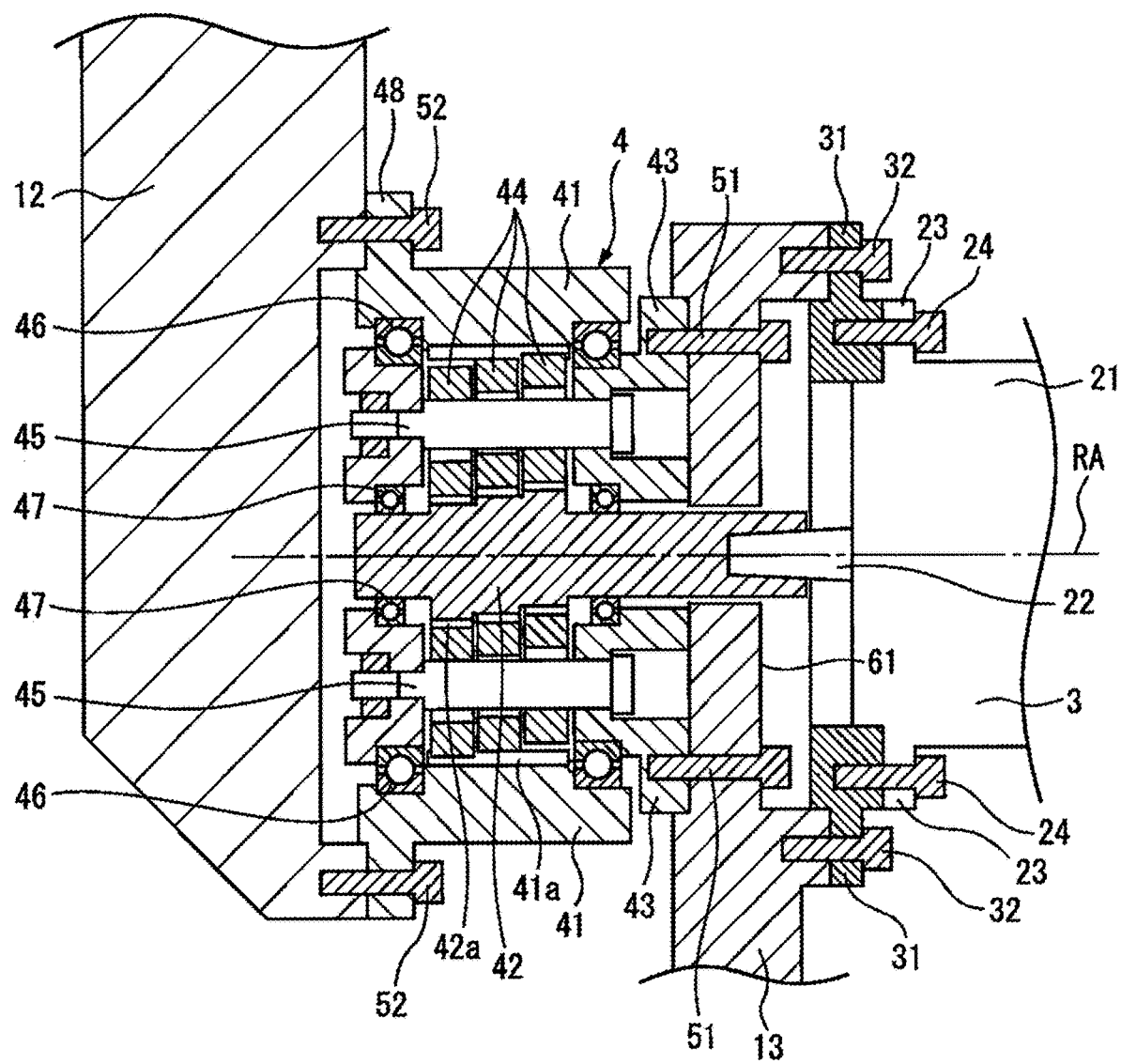
FIG. 3 is an enlarged schematic cross-sectional diagram for illustrating a structure of a reduction gear arranged in a joint according to the embodiment.

FIG. 3 shows an enlarged schematic cross-sectional diagram of the reduction gear in the present embodiment. The reduction gear 4 in the present embodiment is an eccentric rocking type planetary reduction gear. The rotational force of the output shaft 22 of the servo motor 3 is transmitted to the input shaft 42 of the reduction gear 4. On a surface of the input shaft 42 in the circumferential direction, eccentric external teeth 42a are formed. Bearings 47 are arranged between the input shaft 42 and the shaft 43. The input shaft 42 is rotatably supported by the shaft 43. Pins 45 are arranged in the shaft 43.

Gears 44 which are formed to rotate eccentrically are engaged with the input shaft 42. External teeth are formed on the gears 44. The gears 44 are engaged with the external teeth 42a formed on the input shaft 42. The plurality of gears 44 rotate about respective rotary axes which are different from each other. The pins 45 are supported by the shaft 43. Bearings 46 are arranged between the shaft 43 and the reduction gear case 41. Internal teeth 41a are formed on an inner surface of the reduction gear case 41. The internal teeth 41a are engaged with the gears 44.

When the servo motor 3 drives, the input shaft 42 of the reduction gear 4 rotates. The rotational force of the input shaft 42 is transmitted to the gears 44. The gears 44 rotate about the respective rotary axes, and revolve about the rotary axis RA. The rotational force of the gears 44 is transmitted to the reduction gear case 41. Further, the reduction gear case 41 rotates, whereby the lower arm 12 rotates. In accordance with the number of external teeth 42a of the input shaft 42, the number of external teeth of the gears 44, and the number of the internal teeth 41a of the reduction gear case 41, the rotation speed of the input shaft 42 is reduced. As described above, the reduction gear 4 in the present embodiment reduces the rotation speed of the output shaft 22 of the servo motor 3 so as to increase the rotational torque. The lower arm 12 turns with respect to the pivot base 13, and the orientation of the lower arm 12 can be changed.

The reduction gear is not limited to this embodiment. Any reduction gear including the gear reduction case and a gear support member (shaft) which rotates relatively to the gear reduction case may be adopted. For example, a reduction gear including a planetary gear mechanism in which planetary gears rotate and revolve about a sun gear, an eccentric differential reduction gear, or the like may be adopted.

Figure 4:
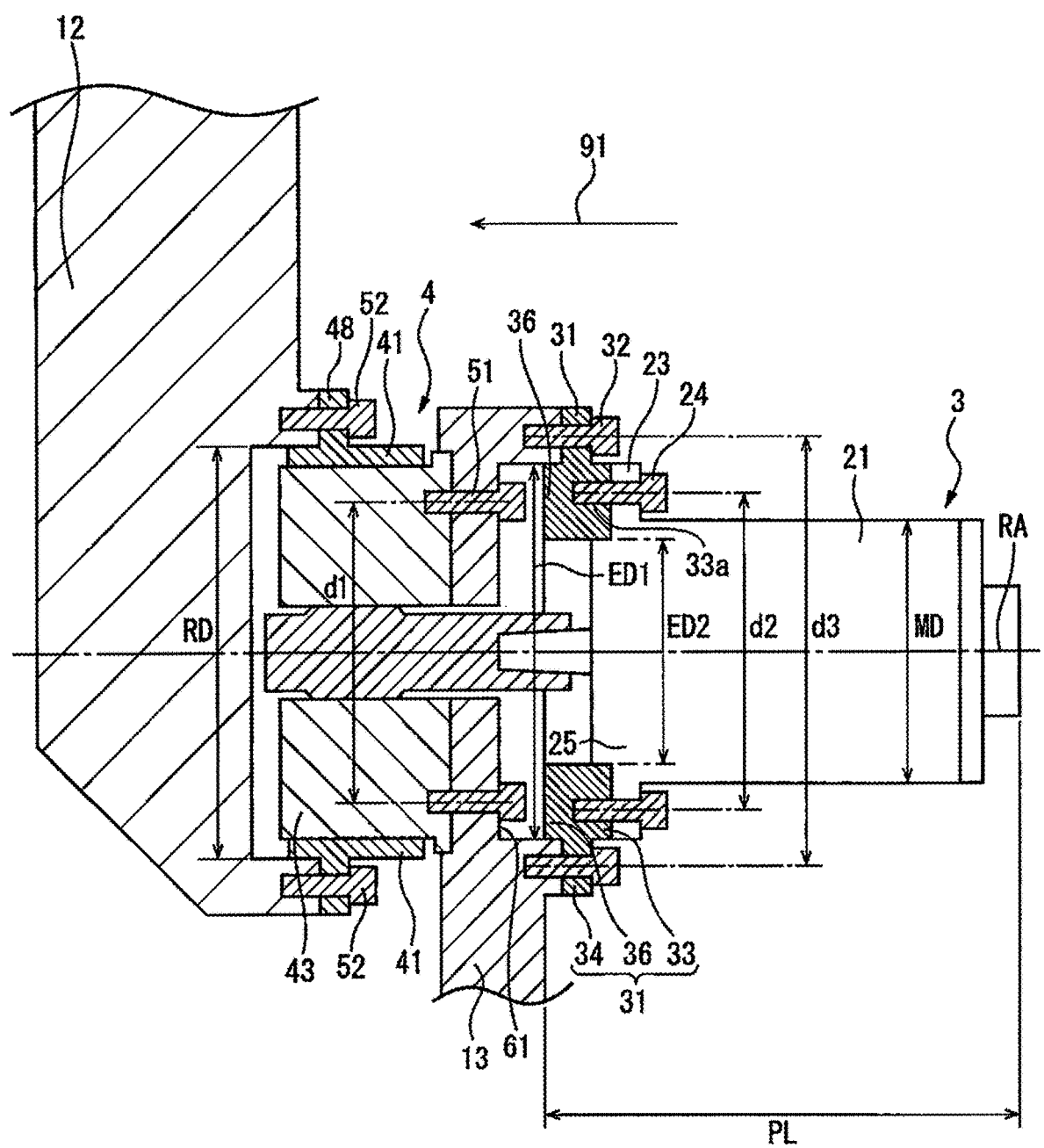
FIG. 4 is an enlarged schematic cross-sectional diagram for illustrating dimensions in the first joint.

FIG. 4 shows a schematic cross-sectional diagram for illustrating dimensions in the joint according to the present embodiment. In the present embodiment, a diameter of an outer surface of the reduction gear case 41 excluding the flange portion 48 is referred to as an outer diameter RD of the reduction gear case 41. The outer diameter RD of the reduction gear case 41 corresponds to an outer diameter of the reduction gear 4. In the servo motor 3, a diameter of an outer surface of the main body 21 excluding the flange portion 23 is referred to as an outer diameter MD of the servo motor 3. Next, a diameter $d_1$ corresponds to a diameter of the positions where the shaft fixing bolts 51 are arranged. The diameter $d_1$ having a point on the rotary axis RA as the center is a distance between the center axes of the shaft fixing bolts 51, which are arranged opposite to each other. That is, the diameter $d_1$ corresponds to a length which is twice the distance from the rotary axis RA to the center axis of the shaft fixing bolt 51. Similarly, a diameter $d_2$ corresponds to a diameter of the positions where the motor fixing bolts 24 are arranged. The diameter $d_2$ is a distance between the center axes of the motor fixing bolts 24 which are arranged opposite to each other. The diameter $d_2$ corresponds to a length which is twice the distance from the rotary axis RA to the center axis of the motor fixing bolt 24. Similarly, a diameter $d_3$ corresponds to a diameter of the positions where the interposition member fixing bolts 32 are arranged. The diameter $d_3$ corresponds to a distance between the center axes of the interposition member fixing bolts 32 that are arranged opposite to each other. The diameter $d_3$ corresponds to a length which is twice the distance from the rotary axis RA to the center axis of the interposition member fixing bolt 32.

In the present embodiment, the motor fixing bolts 24 and the shaft fixing bolts 51 are arranged at positions such that the diameter $d_2$ of the positions where the motor fixing bolts 24 are arranged and the diameter $d_1$ of the positions where the shaft fixing bolts 51 are arranged are smaller than the outer diameter RD of the reduction gear case 41. Further, the shaft fixing bolts 51 and the motor fixing bolts 24 are arranged in the cylindrical region, which has a diameter having the same length as the outer diameter RD and extends along the rotary axis RA. Further, the diameter $d_1$ has a value close to that of the diameter $d_2$. The motor fixing bolts 24 and the shaft fixing bolts 51 are arranged at substantially the same position in the radial direction. Note that, the motor fixing bolts 24 and the shaft fixing bolts 51 may be arranged such that the diameter d1 and the diameter d2 have the same value.

The interposition member 31 has such a shape that the motor fixing bolts 24 are fixed at the positions away from the shaft fixing bolts 51. In the present embodiment, the interposition member 31 are formed so as to be away from the shaft fixing bolts 51 arranged in the recess 61. The motor fixing bolts 24 are fixed to the main body 33 of the interposition member 31. Thus, interference between the shaft fixing bolts 51 and the motor fixing bolts 24 can be prevented.

Figure 5:
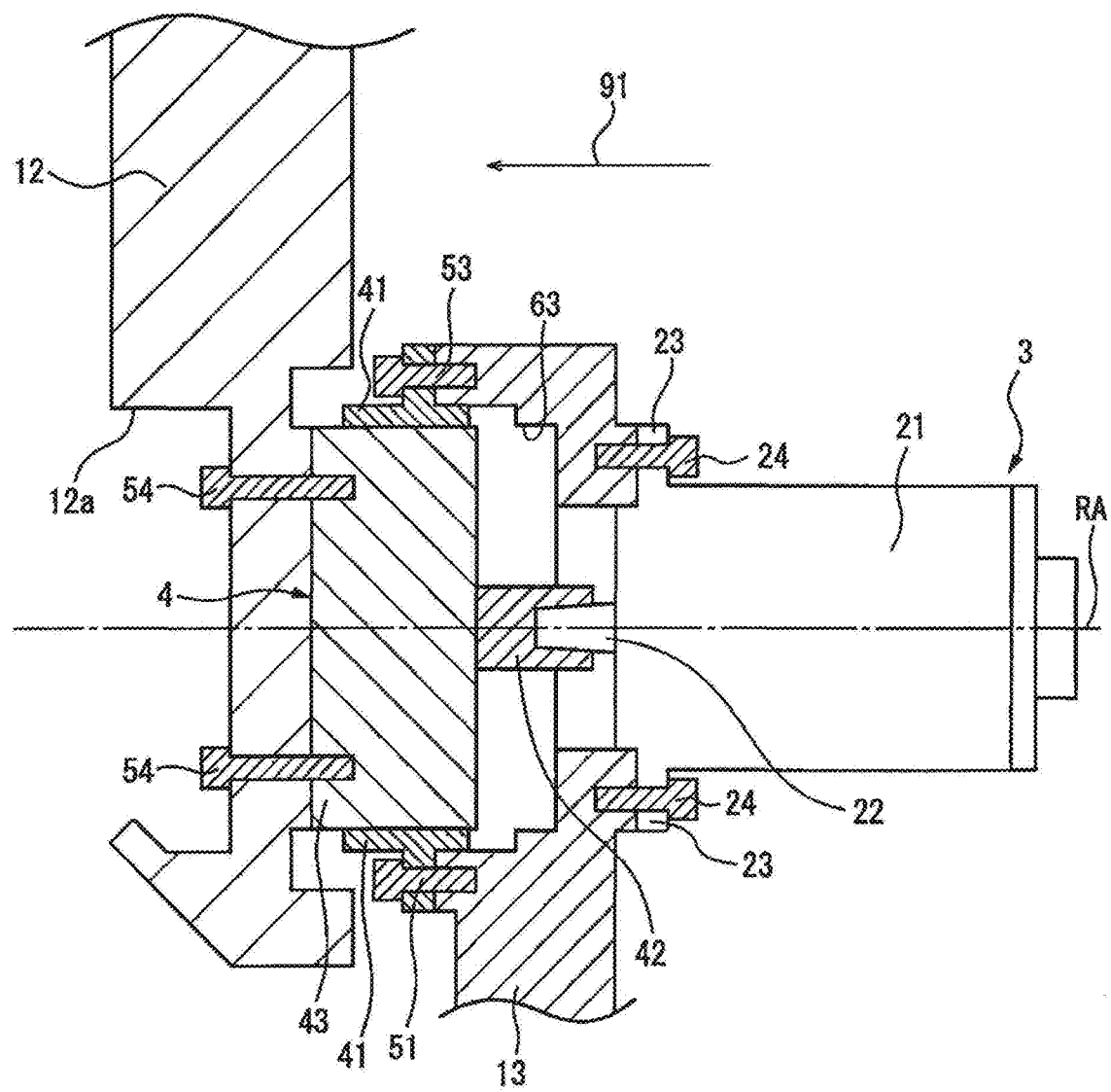
FIG. 5 is an enlarged schematic cross-sectional diagram of a joint of a robot in a comparative example.

FIG. 5 shows an enlarged schematic cross-sectional diagram of a structure of a joint in a comparative example. In the joint of the comparative example, a through hole 63 is formed in a portion of a leading end of the pivot base 13. The servo motor 3 is fixed from one side of the through hole 63. Further, the reduction gear 4 is fixed from the other side of the through hole 63. The reduction gear case 41 is fixed to the pivot base 13 with a bolt 53. Further, the shaft 43 of the reduction gear 4 is fixed to the lower arm 12 with bolts 54.

In the joint in the comparative example, the reduction gear case 41 is not movable. The shaft 43 turns with respect to the reduction gear case 41. The lower arm 12 turns together with the shaft 43. In the joint in the comparative example, the bolts 54 are inserted in the direction from the lower arm 12 to the servo motor 3 (a direction opposite to the arrow 91). Here, when the thickness of the lower arm 12 is large, it is difficult to form holes through which the bolts 54 are inserted. In the comparative example, in order to form the holes through which the bolts 54 are inserted, the lower arm 12 is formed to be thin. A recess 12a is formed in a region in which the bolts 54 of the lower arm 12 are arranged.

By adopting the structure in which the bolts 54 are arranged in the recess 12a, the portion through which the bolts 54 of the lower arm 12 are inserted can be made thin. However, there may be a problem in that the portion of the lower arm 12 in which the recess 12a is formed has a low rigidity. Further, in order to fix the reduction gear 4 to the lower arm 12, a large number of bolts 54 are needed. However, there is a problem in that appearance is degraded because the large number of bolts 54 are visible from the outside of the lower arm 12.

With reference to FIG. 2, as a counter measure, in the joint 18a according to the present embodiment, the arm fixing bolts 52 are inserted and fixed in the direction from the servo motor 3 toward the lower arm 12 as indicated by the arrow 91. Thus, a degree of freedom in the shape of the lower arm 12 is improved. A recess is not required to be formed in the outside of the lower arm 12, and high rigidity of the lower arm 12 can be maintained. Further, the large number of arm fixing bolts 52 can be prevented from being visible in the recess, and appearance of the lower arm 12 can be improved.

Incidentally, in the joint 18a in the present embodiment, the reduction gear case 41 is fixed to the lower arm 12, and the shaft 43 is fixed to the pivot base 13. For this reason, the motor fixing bolts 24 for fixing the servo motor 3 and the shaft fixing bolts 51 for fixing the shaft 43 are arranged so as to be oriented to the same direction. That is, the motor fixing bolts 24 and the shaft fixing bolts 51 are oriented to the direction toward the arrow 91. However, there may be a case where the positions of the shaft fixing bolts 51 and the motor fixing bolts 24 in the radial directions are close to each other and the motor fixing bolts 24 cannot be fixed to the pivot base 13.

With reference to FIG. 4, there is a case where the diameter d1 of the positions of the shaft fixing bolts 51 and the diameter d2 of the positions of the motor fixing bolts 24 are substantially the same. For example, when the outer diameter RD of the reduction gear case 41 is larger than the outer diameter MD of the servo motor 3, the diameter d1 and the diameter d2 are close to each other. Alternatively, when the diameter d2 of the positions of the motor fixing bolts 24 and the diameter d1 of the positions of the shaft fixing bolts 51 are smaller than the outer diameter RD of the reduction gear case 41, the diameter d1 and the diameter d2 are close to each other. Alternatively, when the motor fixing bolts 24 and the shaft fixing bolts 51 are arranged in the cylindrical region, which has the same diameter as the outer diameter RD of the reduction gear case 41 and extends along the rotary axis RA, the diameter d1 and the diameter d2 are close to each other. In such a case, the motor fixing bolts 24 interfere the shaft fixing bolts 51. As a result, there is a problem in that the motor fixing bolts 24 cannot be directly fixed to the pivot base 13.

In the structure of the joint 18a according to the present embodiment, the servo motor 3 is fixed to the pivot base 13 through the intermediation of the interposition member 31. The motor fixing bolts 24 can be fixed at the positions away from the shaft fixing bolts 51. That is, interference between the motor fixing bolts 24 and the shaft fixing bolts 51 can be prevented, and the servo motor 3 can be fixed to the pivot base 13.

Figure 6:
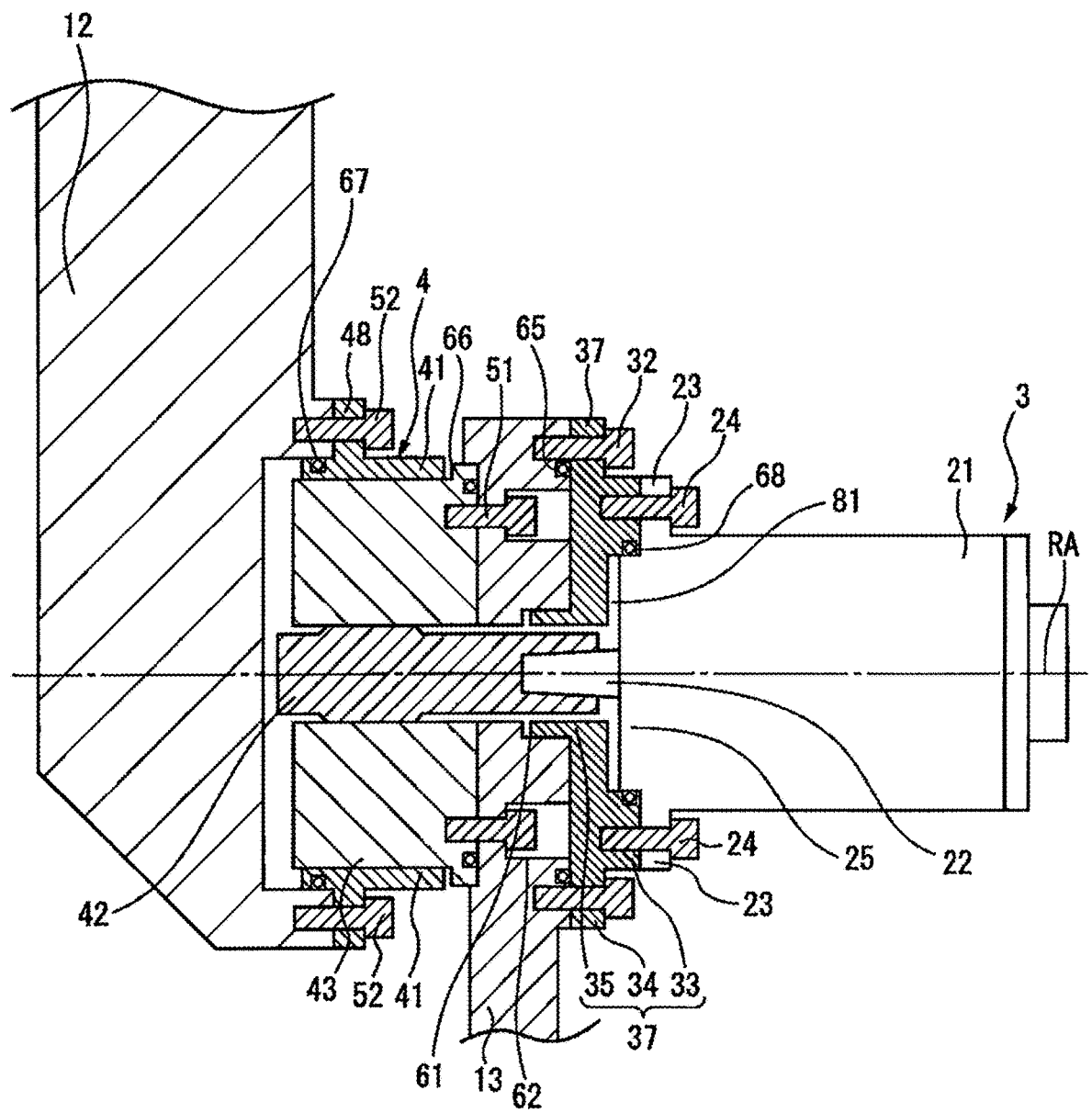
FIG. 6 is an enlarged schematic cross-sectional diagram of a second joint according to the embodiment.

FIG. 6 shows an enlarged schematic cross-sectional diagram of a second joint according to the present embodiment. The second joint is arranged between the pivot base 13 and the lower arm 12. With reference to FIG. 2 and FIG. 6, a structure of an interposition member 37 of the second joint is different from the structure of the interposition member 31 of the first joint.

The interposition member 37 of the second joint includes the main body 33 that has annular shape, the flange portion 34 protruding outward from the main body 33, and a fitting portion 35 protruding inward from the main body 33. The fitting portion 35 has a cross-section having a bent shape. The fitting portion 35 fits to the recess 61 formed in the pivot base 13. Further, in the second joint, a recess 62 is formed for each of the shaft fixing bolts 51. Further, the shaft fixing bolts 51 are arranged in the recess 62. When the interposition member 37 fits to the recess 61 of the pivot base 13 and the fitting portion 25 of the servo motor 3 fits to the main body 33 of the interposition member 37, the rotary axis of the output shaft 22 of the servo motor 3 is formed so as to be coaxial with the rotary axis of the input shaft 42 of the reduction gear 4.

Further, in order to prevent the leakage of the lubricant arranged in the inner space 81, the sealing members 65, 66, 67, and 68 that have elasticity are arranged. The sealing member 65 is arranged at a portion where the main body 33 of the interposition member 37 and the pivot base 13 are held in contact with each other. The sealing member 65 is arranged on an inner side of the interposition member fixing bolts 32. The sealing member 66 is arranged at a portion where the pivot base 13 and the shaft 43 are held in contact with each other. The sealing member 66 is arranged on the outside of the shaft fixing bolts 51. The sealing member 67 is arranged at the portion where the reduction gear case 41 and the lower arm 12 are held in contact with each other. The sealing member 67 is arranged on the inner side of the arm fixing bolts 52. The sealing member 68 is arranged at a portion where the main body 21 of the servo motor 3 and the main body 33 of the interposition member 37 are held in contact with each other. The sealing member 68 is arranged on the inner side of the motor fixing bolts 24.

Figure 7:
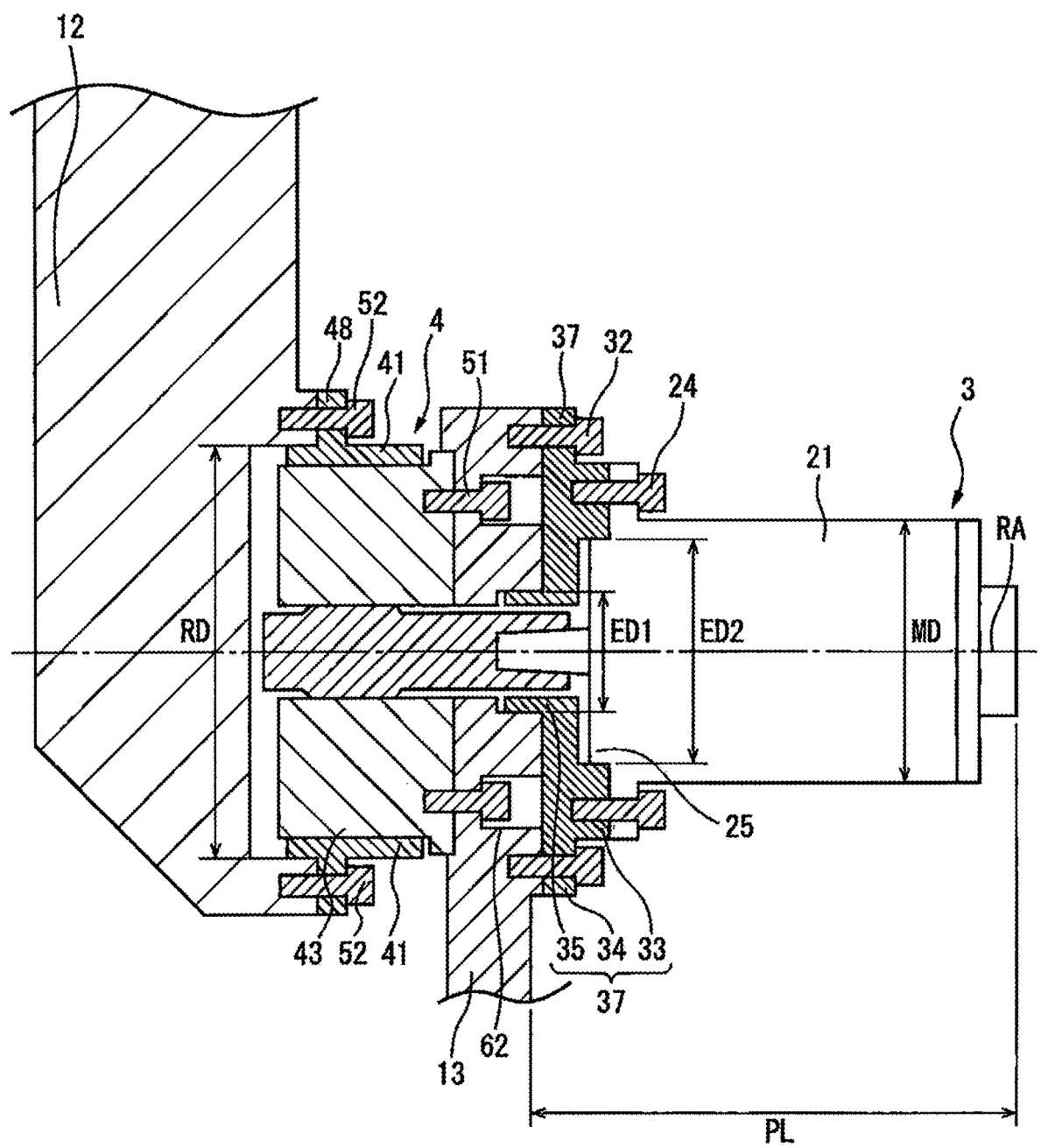
FIG. 7 is an enlarged schematic cross-sectional diagram for illustrating dimensions in the second joint.

FIG. 7 shows a schematic cross-sectional diagram for illustrating dimensions in the second joint according to the present embodiment. In the second joint, an outer diameter ED1 of the fitting portion 35 of the interposition member 37 is smaller than an outer diameter ED2 of the fitting portion 25 of the servo motor 3. With reference to FIG. 4 and FIG. 7, the outer diameter ED1 of the fitting portions 35 and 36 of the interposition members 31 and 37, and the outer diameter ED2 of the fitting portion 25 of the servo motor 3 can be formed to be different from each other.

With reference to FIG. 4, in the first joint, the outer diameter ED1 of the fitting portion 36 of the interposition member 31 is formed to be larger than the outer diameter ED2 of the fitting portion 25 of the servo motor 3. Further, the interposition member 31 has screw holes 33a for fixing the motor fixing bolts 24. The screw holes 33a is formed in the cylindrical region which has the same diameter as the outer diameter ED1 and extends along the rotary axis RA. Further, the fitting portion 36 of the interposition member 31 is arranged in the recess 61 formed in the pivot base 13. In order to form the screw holes 33a, the thickness of the main body 33 of the interposition member 31 is required to be increased. However, in the interposition member 31 of the first joint, a part of the main body 33 is arranged as the fitting portion 36 in the recess 61. The screw holes 33a can be arranged by utilizing the thickness of the fitting portion 36 of the interposition member 31. The part of the main body 33 can be arranged in the recess 61, whereby, a length PL protruding from the pivot base 13 can be smaller than the second joint illustrated in FIG. 7.

The other structures, functions, and effects of the second joint according to the present embodiment are the same as those of the first joint.

In the present embodiment, a description is made of the example of the joint between the pivot base and the lower arm. However, the present invention is not limited to this embodiment. The structure in the present embodiment can be applied to a joint configured to joint any member of the robot. For example, with reference to FIG. 1, the structure of the joint according to the present embodiment can be applied to the joint 18b between the lower arm 12 and the upper arm 11, the joint 18c between the upper arm 11 and the wrist 15, and the like.

Further, in the present embodiment, the lower arm 12 serving as a second member turns with respect to the pivot base 13 serving as a first member. However, the present invention is not limited to this embodiment. The structure according to the above-mentioned embodiment can be applied to a joint of a robot in which the first member and the second member turn relatively to each other. For example, the structure according to the above-mentioned embodiment can be applied to a joint in which the second member is not movable and the first member turns with respect to the second member.

The robot according to the present embodiment is an articulated robot, but the embodiment is not limited to this. Any robot in which at least one member is supported through the intermediation of a joint may be employed. For example, the structure of the joint according to the present embodiment can be applied to a robot including a single joint.

According to an aspect of the present disclosure, the structure of the joint of the robot, which prevents the degradation of the rigidity of the arm, can be provided.

The above-described embodiments may be combined as appropriate. Identical or equivalent parts are given identical reference numerals in the above-described drawings. Note that the above-described embodiments are merely examples and are not intended to limit the invention. Further, changes to the embodiment as indicated in the claims are also included in the embodiment.

The invention claimed is:

1. A structure of a joint of a robot in which a first member and a second member are jointed through intermediation of a joint and in which the first member and the second member turn relatively to each other, the structure of the joint comprising:
    a drive motor configured to drive the second member with respect to the first member;
    a reduction gear including an input shaft configured to receive rotational force of the drive motor, a gear configured to transmit rotational force of the input shaft, a gear support member configured to support the gear, and a reduction gear case to which rotational force of the gear is transmitted; and
    an interposition member interposed between the drive motor and the first member, wherein
    the drive motor is fixed to the interposition member with a plurality of motor fixing bolts arranged in a circumferential direction,
    the interposition member is fixed to the first member,
    the gear support member is fixed to the first member with a plurality of support member fixing bolts arranged in the circumferential direction,
    the reduction gear case is fixed to the second member,
    the motor fixing bolts and the support member fixing bolts are arranged at positions such that a diameter of the positions where the motor fixing bolts are arranged and a diameter of the positions where the support member fixing bolts are arranged are smaller than an outer diameter of the reduction gear case, wherein the outer diameter of the reduction gear case excludes any flange portion, and
    the interposition member has a shape for fixing the motor fixing bolts at positions away from the support member fixing bolts.

2. The structure of the joint according to claim 1, wherein the robot includes a base fixed on an installation surface, a pivot base configured to rotate with respect to the base, and an arm configured to turn with respect to the pivot base,
    the first member is the pivot base, and the second member is the arm.

3. The structure of the joint according to claim 1, wherein the interposition member includes a main body formed in an annular shape and a flange portion through which interposition member fixing bolts configured to fix the interposition member to the first member are inserted,
    the first member includes a recess for fixing the interposition member,
    the drive motor includes a fitting portion configured to be fit into an inner surface of the interposition member,
    the interposition member includes a fitting portion configured to be fit into the recess portion of the first member, and
    the fitting portion of the drive motor is fit into the interposition member, and the fitting portion of the interposition member is fit into the recess of the first member such that a rotary axis of the input shaft of the reduction gear and a rotary axis of an output shaft of the drive motor are coaxially arranged.

4. The structure of the joint according to claim 3, wherein the interposition member includes screw holes configured to fix the motor fixing bolts, the screw holes are formed in a cylindrical region having a diameter equal to an outer diameter of the fitting portion of the interposition member and extending along a rotary axis of the drive motor.

5. The structure of the joint according to claim 1, wherein the reduction gear case is fixed to the second member with a member fixing bolt, and the member fixing bolt is fixed in a direction from the first member toward the second member.

\* \* \* \* \*